(12) United States Patent
Xie et al.

(10) Patent No.: US 9,952,695 B2
(45) Date of Patent: Apr. 24, 2018

(54) TOUCH DISPLAY DEVICE AND ELECTRONIC APPARATUS

(71) Applicant: Shenzhen China Star Optoelectronics Technology Co., Ltd., Shenzhen, Guangdong (CN)

(72) Inventors: Jianxing Xie, Guangdong (CN); Yao Li Huang, Guangdong (CN); Chun Hung Huang, Guangdong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 86 days.

(21) Appl. No.: 14/418,628

(22) PCT Filed: Jan. 8, 2015

(86) PCT No.: PCT/CN2015/070384
§ 371 (c)(1),
(2) Date: May 10, 2016

(87) PCT Pub. No.: WO2016/106808
PCT Pub. Date: Jul. 7, 2016

(65) Prior Publication Data
US 2016/0246416 A1 Aug. 25, 2016

(30) Foreign Application Priority Data
Dec. 31, 2014 (CN) .......................... 2014 1 0856122

(51) Int. Cl.
*G06F 3/041* (2006.01)
*G06F 3/044* (2006.01)

(52) U.S. Cl.
CPC ............ *G06F 3/0412* (2013.01); *G06F 3/044* (2013.01); *G06F 2203/04103* (2013.01); *G06F 2203/04111* (2013.01); *Y10S 977/742* (2013.01)

(58) Field of Classification Search
CPC ........... G06F 3/044; G06F 2203/04111; G06F 2203/04103; G06F 3/0412; Y10S 977/742
See application file for complete search history.

(56) References Cited

U.S. PATENT DOCUMENTS

2012/0313877 A1 12/2012 Han
2014/0168540 A1\* 6/2014 Wang .................... G06F 3/0412
349/12

(Continued)

FOREIGN PATENT DOCUMENTS

CN 102541334 A 7/2012
CN 203133794 U 8/2013

(Continued)

OTHER PUBLICATIONS

International Search Report and Written Opinion, dated Jan. 8, 2015, China.

*Primary Examiner* — Abhishek Sarma
(74) *Attorney, Agent, or Firm* — Kim Winston LLP

(57) ABSTRACT

A touch display device and an electronic apparatus are disclosed. The touch display device comprises a sensing layer, an insulation layer, and a common electrode layer arranged in sequence. The common electrode layer comprises driving areas, suspension areas, and driving wirings. The sensing layer comprises suspended connection lines. According to the present disclosure, the technical difficulty of hole-digging thereof can be reduced effectively, the structure of the product can be simplified, and the qualified rate of the product can be improved.

20 Claims, 4 Drawing Sheets

(56) References Cited

U.S. PATENT DOCUMENTS

| | | | | |
|---|---|---|---|---|
| 2015/0049044 A1* | 2/2015 | Yousefpor | ............... | G06F 3/044 345/174 |
| 2016/0034064 A1* | 2/2016 | Ding | ....................... | G06F 3/044 345/174 |
| 2016/0117031 A1* | 4/2016 | Han | ..................... | G06F 3/0412 345/174 |
| 2016/0179252 A1* | 6/2016 | Chang | ................... | G06F 3/0412 345/174 |
| 2016/0291790 A1* | 10/2016 | Yao | ....................... | G06F 3/0418 |
| 2016/0357337 A1* | 12/2016 | Li | ........................... | G06F 3/044 |
| 2017/0255306 A1* | 9/2017 | Xie | ....................... | G06F 3/0412 |

FOREIGN PATENT DOCUMENTS

| | | |
|---|---|---|
| CN | 103278955 A | 9/2013 |
| CN | 203502710 U | 3/2014 |
| CN | 103777825 A | 5/2014 |
| CN | 104238787 A | 12/2014 |

\* cited by examiner

TOUCH DISPLAY DEVICE AND ELECTRONIC APPARATUS

CROSS REFERENCE TO RELATED APPLICATION

The present application claims benefit of Chinese patent application CN 201410856122.0, entitled "Touch Display Device and Electronic Apparatus" and filed on Dec. 31, 2014, the entirety of which is incorporated herein by reference.

FIELD OF THE INVENTION

The present disclosure relates to the technical field of display, and particularly to a touch display device and an electronic apparatus comprising the touch display device.

BACKGROUND OF THE INVENTION

With the popularization of intelligent electronic products, capacitive touch screen has been widely used in various electronic products, such as smart phones, tablet personal computers, etc. The capacitive touch screen in the prior art comprises plug-in capacitive screen represented by Glass+ Glass (G+G) screen, Glass-Film (GF) screen, Glass-Film-Film (GFF) screen, and One Glass Solution (OGS) screen, as well as embedded capacitive screen represented by On cell screen and In cell screen. In recent years, the lighter and thinner user experience is pursued, and thus the OGS screen technology, the On cell screen technology and In cell screen technology have been competing with one another. The capacitive screen made through In cell technology is thinner, has a better light transmittance, and can satisfy the users' requirements better because of its unique advantages during manufacturing process compared with the capacitive screen made through OGS technology and On cell technology. Therefore, the In cell touch display device will inevitably become the mainstream of the touch display device.

FIG. 1 is a plan view of a common electrode layer 100 of an In cell touch display device in the prior art. The common electrode layer 100 is divided into a plurality of driving areas 101 and a plurality of sensing areas 102. Each driving area 101 is provided with a corresponding driving area electrode, and each sensing area 102 is provided with a corresponding sensing area electrode. Specifically, the driving areas 101 are arranged in a matrix, and a sensing area 102 is arranged between two adjacent columns of driving area 101. Two driving area electrodes arranged in two adjacent driving areas 101 in a same row (i.e., a driving area pair) are electrically connected with each other through a driving wiring 103. Since the existence of the sensing area 102, the driving wiring 103 shall be arranged in a bridging manner.

FIG. 2 schematically shows an arrangement of the driving wiring 103 as shown in FIG. 1. As shown in FIG. 2, a flattening layer 200 and a gate insulation layer 300 are arranged in sequence under the common electrode layer 100. The flattening layer 200 is provided with data lines and a plurality of first via holes 201, and the gate insulation layer 300 is provided with a plurality of second via holes 301 and a plurality of metal connection lines 302. Since the existence of the data lines, the flattening layer 200 cannot be provided with metal connection lines 302 to avoid the interference between the metal connection lines 302 and the data lines. Each driving area pair is associated with the first via holes 201 with a number of two, the second via holes 301 with a number of two, and a corresponding metal connection line 302. The driving area electrode in one driving area 101 runs through the first via hole 201 and the second via hole 301 right below and is electrically connected with one end of the metal connection line 302, and the driving area electrode in another driving area 101 runs through the first via hole 201 and the second via hole 301 right below and is electrically connected with another end of the metal connection line 302. It should be noted that, the driving area electrodes running through the first via holes 201 and the second via holes 301 as well as the metal connection line 302 jointly constitute the driving wiring 103 which is used for connecting the driving area pair. It can be seen that, two layers of structure need to be perforated through in order to arrange the driving wiring 103. Moreover, the thickness of the flattening layer 200 is generally high (such as 2 μm, which is 20 times the thickness of the gate insulation layer 300), and thus the technical difficulty of perforation thereof is further increased. Therefore, the manufacturing of the In cell touch display device in the prior art is complex, and the qualified rate thereof is low.

SUMMARY OF THE INVENTION

During the manufacturing of the In cell touch display device in the prior art, the flattening layer and the gate insulation layer need to be perforated through in order to arrange the driving wiring. Moreover, the thickness of the flattening layer is generally high, and thus the technical difficulty of perforation thereof is further increased. Therefore, the manufacturing of the In cell touch display device in the prior art is complex, and the qualified rate thereof is low. The present disclosure aims to solve the aforesaid technical problem.

In order to solve the aforesaid technical problem, the present disclosure provides a touch display device and an electronic apparatus comprising the touch display device.

According to one aspect, the present disclosure provides a touch display device, comprising a sensing layer, an insulation layer, and a common electrode layer that are arranged from top to bottom in sequence. Said common electrode layer comprises: a plurality of driving areas arranged in a rectangular array, each driving area being provided with a driving area electrode; a plurality of suspension areas arranged between two adjacent columns of driving area, each suspension area being provided with a suspension area electrode, and two adjacent suspension areas being separated from each other and constituting a suspension area pair; and a driving wiring running through a gap between two adjacent suspension areas, the driving area electrodes in two adjacent driving areas in a same row being electrically connected with each other through said driving wiring. Said sensing layer comprises a plurality of suspended connection lines each corresponding to a respective suspension area pair, one end of each suspended connection line being electrically connected with a suspension area electrode in a suspension area of a suspension area pair through a first via hole in the insulation layer, the other end thereof being electrically connected with a suspension area electrode in another suspension area of the suspension area pair through a second via hole in the insulation layer.

Preferably, when an image is displayed, said driving area electrode and said suspension area electrode are both electrically connected with an output end of a common voltage of a driving circuit. And when a touch scanning is performed, said driving area electrode is electrically connected with the output end of the common voltage of the driving circuit, while said suspension area electrode is empty.

Preferably, said sensing layer further comprises a plurality of first sensing areas each corresponding to a respective suspension area, each first sensing area being arranged right above a corresponding suspension area and provided with a sensing area electrode.

Preferably, the sensing area electrode in said first sensing area is one selected from a group consisting of a metal grid, a transparent indium tin oxide electrode, and a carbon nanotube electrode.

Preferably, said sensing layer further comprises a plurality of second sensing areas each corresponding to a respective driving area, each second sensing area being arranged right above a corresponding driving area and provided with a sensing area electrode. The sensing area electrode in the second sensing area is electrically connected with the driving area electrode in the corresponding driving area through a third via hole in the insulation layer.

Preferably, the sensing area electrode in the second sensing area is electrically connected with the driving area electrode in the corresponding driving area through third via holes with a number of at least two in the insulation layer.

Preferably, said third via holes are arranged in a rectangular array.

Preferably, a center-to-center distance between two adjacent third via holes in a same row is three pixels, and a center-to-center distance between two adjacent third via holes in a same column is three pixels.

Preferably, the sensing area electrode in said second sensing area is one selected from a group consisting of a metal grid, a transparent indium tin oxide electrode, and a carbon nanotube electrode.

According to another aspect, the present disclosure provides an electronic apparatus comprising the aforesaid touch display device.

Compared with the prior art, one embodiment or a plurality of embodiments according to the present disclosure may have the following advantages or beneficial effects.

According to the touch display device of the present disclosure, the driving area electrodes and the sensing area electrodes are arranged in the common electrode layer and the sensing layer respectively, and the common electrode layer and the sensing layer are separated only by the insulation layer. The driving area electrodes can be electrically connected by the driving wirings in the common electrode layer, and the suspension area electrodes can be electrically connected by the suspended wirings that are arranged in the sensing layer and the insulation layer. When each suspended wiring is formed, only the insulation layer needs to be perforated. The thickness of the insulation layer is far less than that of the flattening layer, so that the technical difficulty of perforation can be reduced effectively. At the same time, the defect of low qualified rate resulted from perforation in multiple layers can be eliminated, the structure of the product can be simplified, and the qualified rate thereof can be improved. Moreover, the touch display device can be manufactured through traditional Thin Film Transistor (TFT) technology, and thus the currently used machine configuration needs not to be changed. In addition, the touch function and display function are integrated into one display panel through the In cell technology, and thus the production efficiency thereof can be improved.

Other features and advantages of the present disclosure will be further explained in the following description, and partially become self-evident therefrom, or be understood through the embodiments of the present disclosure. The objectives and advantages of the present disclosure will be achieved through the structure specifically pointed out in the description, claims, and the accompanying drawings.

BRIEF DESCRIPTION OF THE DRAWINGS

The accompanying drawings provide further understandings of the present disclosure and constitute one part of the description. The drawings are used for interpreting the present disclosure together with the embodiments, not for limiting the present disclosure. In the drawings.

DETAILED DESCRIPTION OF THE EMBODIMENTS

The present disclosure will be explained in details with reference to the embodiments and the accompanying drawings, whereby it can be fully understood how to solve the technical problem by the technical means according to the present disclosure and achieve the technical effects thereof, and thus the technical solution according to the present disclosure can be implemented. It should be noted that, as long as there is no conflict, all the technical features mentioned in all the embodiments may be combined together in any manner, and the technical solutions obtained in this manner all fall within the scope of the present disclosure.

During the manufacturing of the In cell touch display device in the prior art, the flattening layer and the gate insulation layer need to be perforated through in order to arrange the driving wiring. Moreover, the thickness of the flattening layer is generally high, and thus the technical difficulty of perforation is further increased. Therefore, the manufacturing of the In cell touch display device in the prior art is complex, and the qualified rate thereof is low. The present disclosure aims to solve the aforesaid technical problem. In order to solve the technical problem, the embodiment of the present disclosure provides a touch display device.

Figure 1:
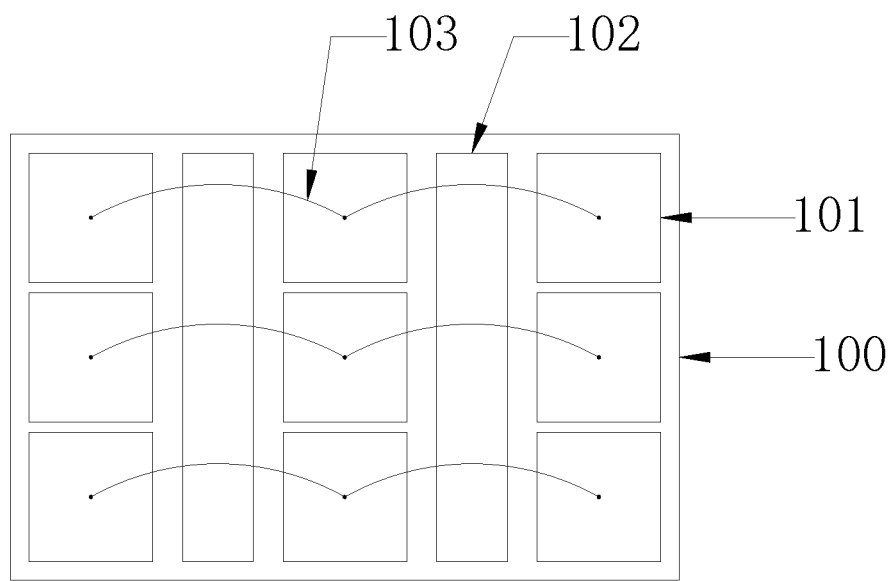
FIG. 1 is a plan view of a common electrode layer of a In cell touch display device in the prior art.
Figure 2:
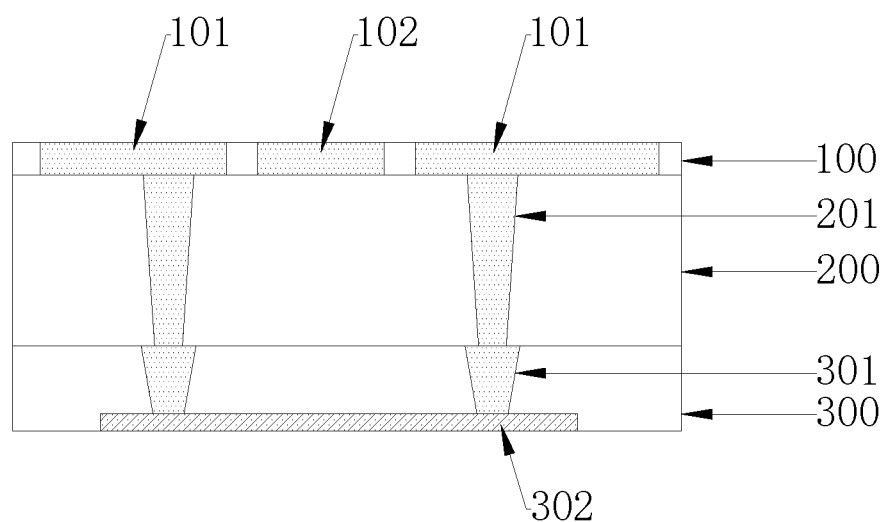
FIG. 2 schematically shows an arrangement of the driving wiring as shown in FIG. 1.
Figure 3:
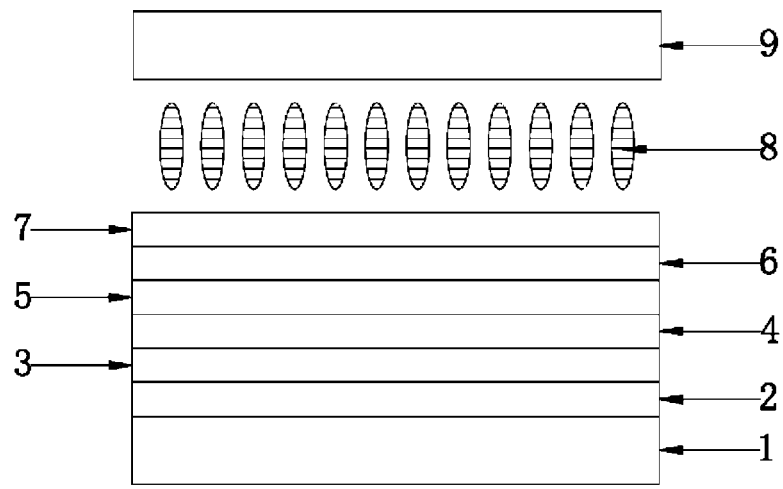
FIG. 3 schematically shows a structure of a touch display device according to one embodiment of the present disclosure.

FIG. 3 schematically shows a structure of a touch display device according to the embodiment of the present disclosure. The touch display device comprises a common electrode layer 3, a first insulation layer 4 that is formed on the common electrode layer 3, and a sensing layer 5 that is formed on the first insulation layer 4. In addition, the touch display device further comprises a TFT array substrate 1, a TFT array 2 that is formed on the TFT array substrate 1, a second insulation layer 6 that is formed on the sensing layer 5, a pixel electrode layer 7 that is formed on the second insulation layer 6, a liquid crystal layer 8 that is formed on the pixel electrode layer 7, and a color filter substrate 9 that is formed on the liquid crystal layer 8. The common electrode layer 3 is formed on the TFT array 2.

Figure 4:
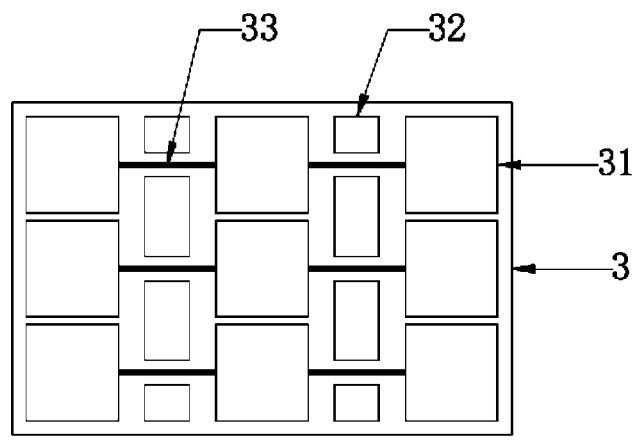
FIG. 4 is a plan view of a common electrode layer as shown in FIG. 3.

Specifically, FIG. 4 is a plan view of the common electrode layer 3 as shown in FIG. 3. As shown in FIG. 4, the common electrode layer 3 comprises a plurality of driving areas 31, a plurality of suspension areas 32, and a plurality of driving wirings 33. The driving areas 31 are arranged in a rectangular array, and each driving area 31 is provided with a driving area electrode, which is controlled by an output end of a common voltage of a driving circuit (which is not shown in FIG. 4). The plurality of suspension areas 32 are arranged between two adjacent columns of driving area 31. Reference can be made to FIG. 4, similar to the driving areas 31, the suspension areas 32 are also arranged in a rectangular array. Two adjacent suspension areas 32 are separated by a preset gap, and each suspension area 32 is provided with a suspension area electrode. When an image is displayed, each suspension area electrode is also controlled by the output end of the common voltage of the driving circuit. In the touch display device, the touch and display are controlled respectively in a time-shared driving mode, which will be illustrated in detail hereinafter. According to the present disclosure, two adjacent suspension areas 32 constitute a suspension area pair. With respect to each suspension area pair, there is a driving wiring 33 running through the gap therein (i.e., the gap between the two adjacent suspension areas 32 which constitute the suspension area pair), so that the driving area electrodes in two adjacent driving areas 31 in a same row are electrically connected with each other through the driving wiring 33. The driving area electrodes in two adjacent driving areas 31 in a same column are disconnected. The driving area electrodes are electrically connected by the driving wirings 33 in the common electrode layer 3, while the suspension area electrodes are electrically connected by suspended wirings, and reference can be made to FIGS. 5, 6, and 7 simultaneously.

Figure 5:
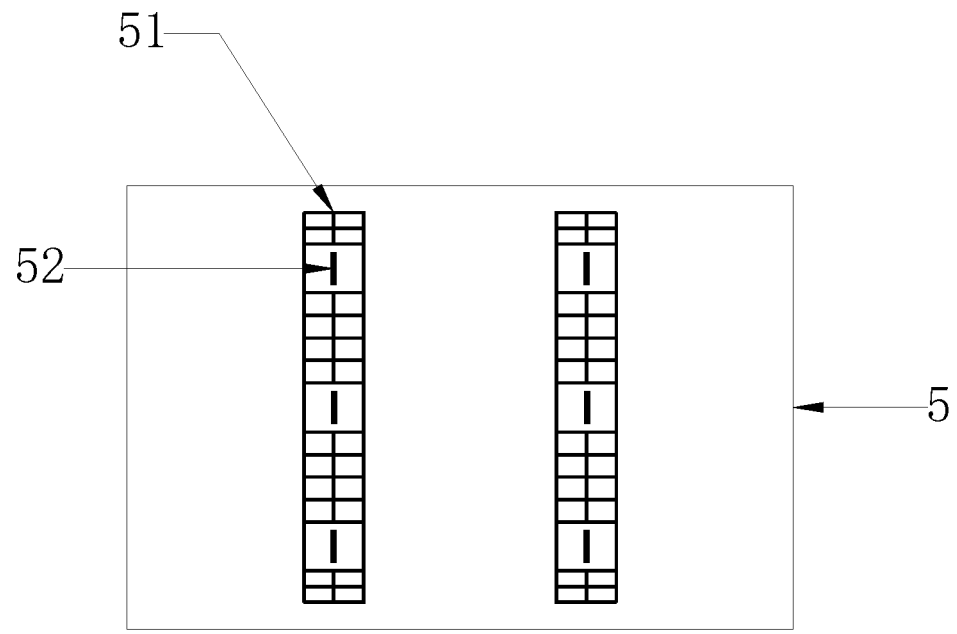
FIG. 5 is a plan view of a sensing layer as shown in FIG. 3.
Figure 6:
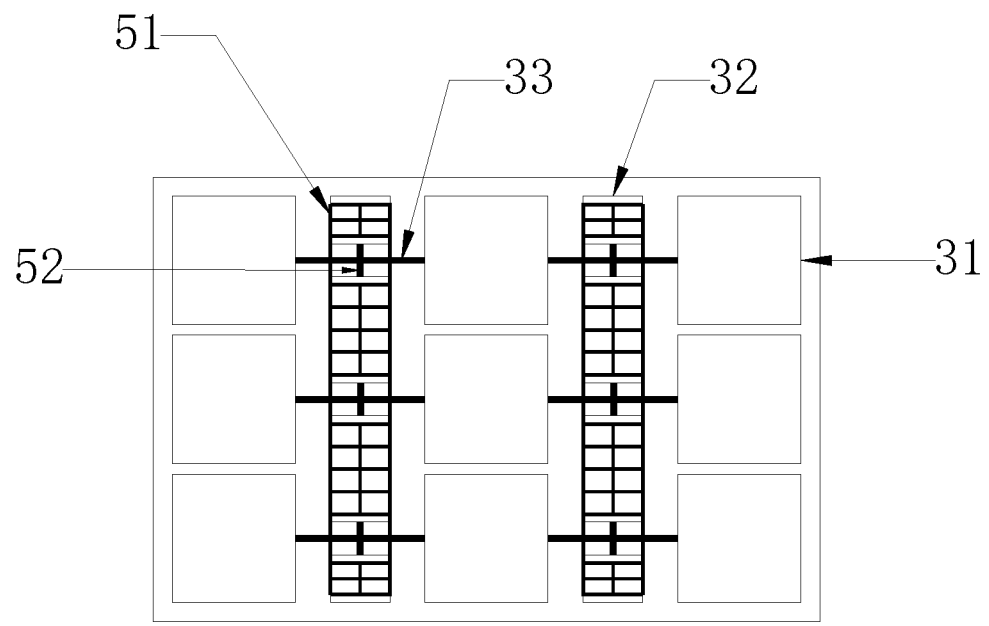
FIG. 6 is a plan view when the sensing layer as shown in FIG. 5 and the common electrode layer as shown in FIG. 4 overlap with each other.
Figure 7:
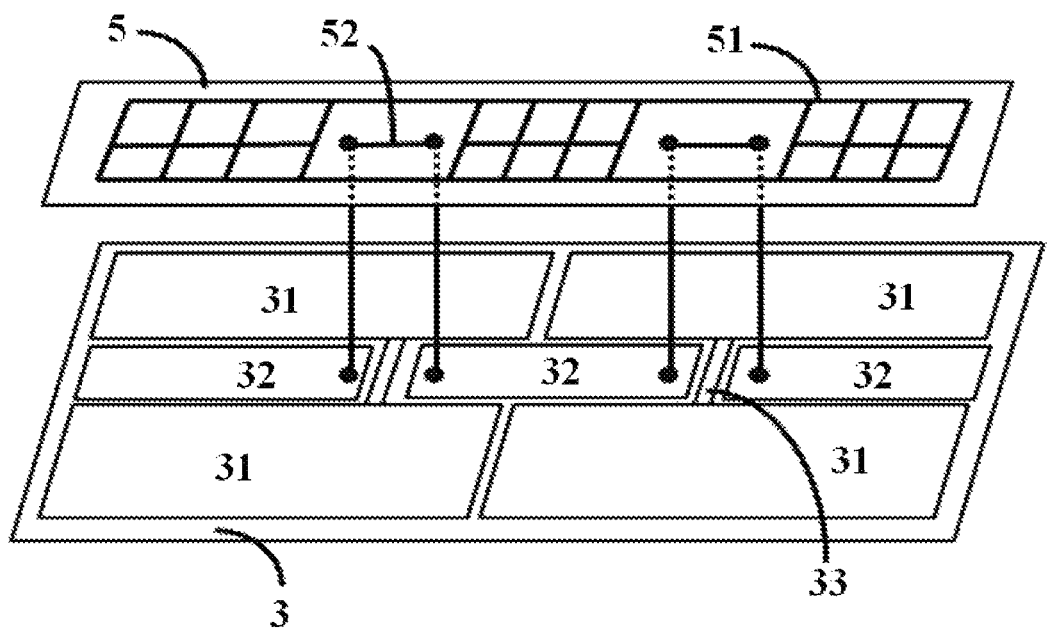
FIG. 7 schematically shows the suspension area electrodes in the suspension areas as shown in FIG. 4 being connected through suspended wirings.

FIG. 5 is a plan view of the sensing layer 5 as shown in FIG. 3, FIG. 6 is a plan view when the sensing layer 5 as shown in FIG. 5 and the common electrode layer 3 as shown in FIG. 4 are put together, and FIG. 7 schematically shows the suspension area electrodes in the suspension areas 32 as shown in FIG. 4 being connected through suspended wirings. As shown in FIGS. 5, 6, and 7, the sensing layer 5 comprises a plurality of suspended connection lines 52, and the number of the suspended connection lines 52 is equal to the number of the suspension area pairs. Each suspended connection line 52 corresponds to a respective suspension area pair exclusively. The first insulation layer 4 is provided with a plurality of first via holes (not shown in FIG. 5, 6, or 7) and a plurality of second via holes (not shown in FIG. 5, 6, or 7), wherein the number of the first via holes is equal to the number of the suspension area pairs, and the number of the second via holes is equal to the number of the suspension area pairs as well. Each of the first via holes corresponds to a respective suspension area pair exclusively (or corresponds to a respective suspended connection line 52 exclusively), and each of the second via holes corresponds to a respective suspension area pair exclusively (or corresponds to a respective suspended connection line 52 exclusively). Each first via hole is provided with one end of a corresponding suspended connection line 52 right above, and a suspension area 32 in a corresponding suspension area pair right below. Each second via hole is provided with another end of the corresponding suspended connection line 52 right above, and another suspension area 32 in the corresponding suspension area pair right below. Therefore, with respect to each suspended connection line 52, one end thereof is electrically connected with a suspension area electrode in a suspension area 32 of a suspension area pair through a first via hole in the first insulation layer 4, and the other end thereof is electrically connected with a suspension area electrode in another suspension area 32 of the suspension area pair through a second via hole in the first insulation layer 4. It should be noted that, the suspended connection line 52 running through the first via hole and the second via hole as well as the suspended connection line 52 in the sensing layer 5 jointly constitute the suspended wiring which is used for connecting the suspension area pair. The suspension area electrodes in two adjacent suspension areas 32 can be electrically connected with each other with the above structure.

According to the present embodiment, the driving area electrodes and the sensing area electrodes are arranged in the common electrode layer 3 and the sensing layer 5 respectively, and the common electrode layer 3 and the sensing layer 5 are separated only by the first insulation layer 4. The driving area electrodes can be electrically connected by the driving wirings 33 in the common electrode layer 3, and the suspension area electrodes can be electrically connected by the suspended wirings that are arranged in the sensing layer 5 and the first insulation layer 4. When each suspended wiring is formed, only the first insulation layer 4 needs to be perforated. The thickness of the first insulation layer 4 is far less than that of the flattening layer, so that the technical difficulty of perforation can be reduced effectively. At the same time, the defect of low qualified rate resulted from perforation in multiple layers can be eliminated, the structure of the product can be simplified, and the qualified rate thereof can be improved. Moreover, the touch display device can be manufactured through traditional TFT technology, and thus the currently used machine configuration needs not to be changed. In addition, the touch function and display function are integrated into one display panel through the In cell technology, and thus the production efficiency thereof can be improved.

According to one preferred embodiment of the present disclosure, the touch and display are controlled respectively in a time-shared driving mode, so that the display function and touch function of the touch display device can cooperate with each other perfectly. Specifically, when the image is displayed, the driving area electrodes in the driving areas 31 and the suspension area electrodes in the suspension areas 32 are all electrically connected with the output end of the common voltage of the driving circuit. When a touch scanning is performed, the driving area electrodes in the driving areas 31 are still electrically connected with the output end of the common voltage of the driving circuit, while the suspension area electrodes in the suspension areas 32 are empty. According to one preferred embodiment of the present disclosure, the empty state of the suspension area electrodes can be realized through the following method. An electronic switch can be arranged in series connection between the suspension area electrodes and the output end of the common voltage of the driving circuit, and is controlled by a controller. The controller can determine whether the touch display device is in an image displaying state or a touch scanning state. When the touch display device is in the image displaying state, the electronic switch is turned on under the control of the controller, so that the suspension area electrodes and the output end of the common voltage of the driving circuit can be electrically connected with each other. When the touch display device is in the touch scanning state, the electronic switch is turned off under the control of the controller, so that the suspension area electrodes and the output end of the common voltage of the driving circuit can be disconnected, and thus the suspension area electrodes are empty. Specifically, the electronic switch is preferably a switching transistor.

According to one preferred embodiment of the present disclosure, as shown in FIGS. 5 to 7 again, the sensing layer 5 further comprises a plurality of first sensing areas 51 each corresponding to a respective suspension area 32, and each first sensing area 51 is arranged right above a corresponding suspension area 32 and provided with a sensing area electrode. When a touch scanning is performed, the driving area electrodes in the driving areas 31 are still electrically connected with the output end of the common voltage of the driving circuit, while the suspension area electrodes in the suspension areas 32 are empty. The suspension area electrode can be electrically coupled with a corresponding sensing area electrode, so that the signal sensing volume can be increased, and the signal-to-noise ratio thereof can be improved. Specifically, the sensing area electrode in the first sensing area 51 is preferably one selected from a group consisting of a metal grid, a transparent indium tin oxide electrode, and a carbon nanotube electrode. When the sensing area electrode in the first sensing area 51 is the metal grid, the resistance thereof can be reduced, the sensing layer can be made thinner, and the strength as well as the cost-effectiveness of the touch display device can be improved.

Figure 8:
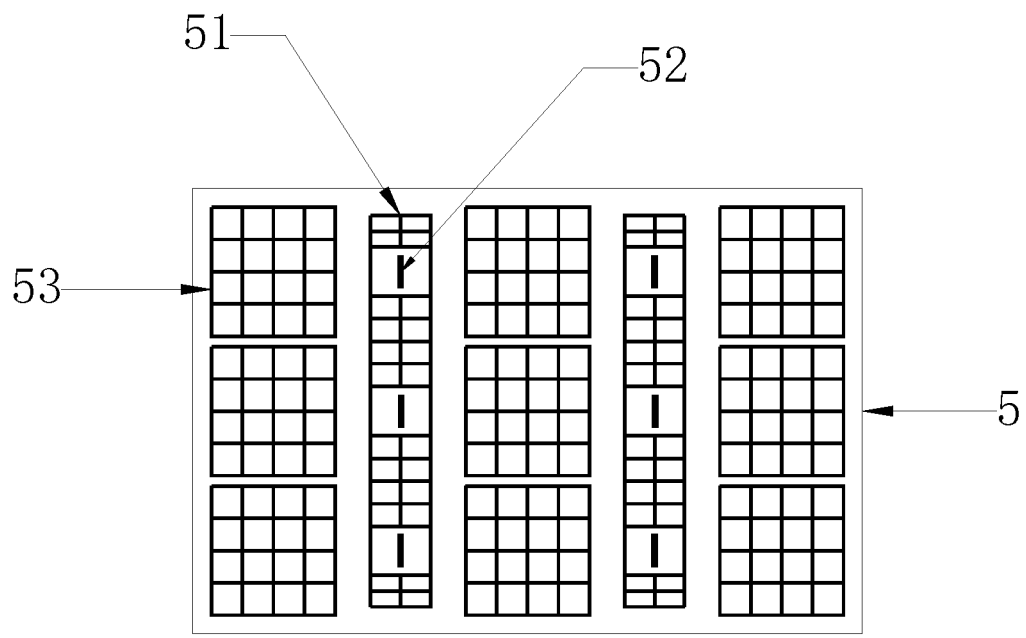
FIG. 8 is another plan view of the sensing layer as shown in FIG. 3.

Further, FIG. 8 is another plan view of the sensing layer 5 as shown in FIG. 3. As shown in FIG. 8, on the basis of the above embodiment, the sensing layer 5 further comprises second sensing areas 53. The number of the second sensing areas 53 is equal to the number of the driving areas 31. Each second sensing area 53 corresponds to a respective driving area 31 exclusively and is arranged right above the corresponding driving area 31. In addition, each second sensing area 53 is provided with a sensing area electrode. Accordingly, the first insulation layer 4 is further provided with a third via hole (not shown in FIG. 8) which is used for connecting the sensing area electrode and the corresponding driving area electrode. The sensing area electrode in the second sensing area 53 is electrically connected with the driving area electrode in the corresponding driving area 31 through a third via hole in the first insulation layer 4. Specifically, similar to the material of the sensing area electrode in the first sensing area 51, the sensing area electrode in the second sensing area 53 is preferably one selected from a group consisting of a metal grid, a transparent indium tin oxide electrode, and a carbon nanotube electrode. When the sensing area electrode in the second sensing area 53 is the metal grid, the resistance thereof can be reduced, the sensing layer can be made thinner, and the strength as well as the cost-effectiveness of the touch display device can be improved.

According to the present embodiment, the balance of the pixels displayed therein can be improved by the sensing area electrodes arranged in the second sensing areas 53, and the reasons thereof will be illustrated below. In the prior art, the driving area electrodes are generally transparent indium tin oxide electrodes and the resistance thereof is relatively large. During the process when the driving area electrodes are formed, the resistance difference among the driving area electrodes in each driving area 31 is relatively large, and thus the pixels displayed therein are imbalance. According to the present embodiment, because of the sensing area electrodes arranged in the second sensing areas 53, which can be deemed as being equivalent to that a resistor is provided in parallel connection with each driving area electrode. Therefore, the total resistance after the driving area electrode and the sensing area electrode are in parallel connection with each other is reduced, so that the difference of the resistance (the total resistance after parallel connection) among the driving area electrodes in each driving area 31 can be reduced and the balance of the pixels displayed therein can be improved. Moreover, when the sensing area electrodes in the second sensing areas 53 are preferably the metal grid, the problem of low qualified rate resulted from the excessive reduction of the total resistance can be avoided since the resistance of the metal grid is relatively small.

Further, the third via hole which is used for connecting the sensing area electrodes in the second sensing areas 53 and the driving area electrodes can be a via hole, or can be a set of multiple via holes. According to one preferred embodiment of the present disclosure, the sensing area electrode in the second sensing area 53 is electrically connected with the driving area electrode in the corresponding driving area 31 through third via holes with a number of at least two in the first insulation layer 4. Further, the third via holes are arranged in a rectangular array. In addition, a center-to-center distance between two adjacent third via holes in a same row is three pixels, and a center-to-center distance between two adjacent third via holes in a same column is three pixels.

Accordingly, the embodiment of the present disclosure further provides an electronic apparatus comprising the aforesaid touch display device. Specifically, the electronic apparatus can be liquid crystal display panel, electronic paper, liquid crystal television, liquid crystal display device, digital photo frame, mobile phone, tablet personal computer as well as any other products or components having display function.

The above embodiments are described only for better understanding, rather than restricting, the present disclosure. Any person skilled in the art can make amendments to the implementing forms or details without departing from the spirit and scope of the present disclosure. The protection scope of the present disclosure shall be determined by the scope as defined in the claims.

The invention claimed is:

1. A touch display device, comprising a sensing layer, an insulation layer, and a common electrode layer that are arranged from top to bottom in sequence,
    wherein said common electrode layer comprises:
        a plurality of driving areas arranged in a rectangular array, each driving area being provided with a driving area electrode;
        a plurality of suspension areas arranged between two adjacent columns of driving area, each suspension area being provided with a suspension area electrode, and two adjacent suspension areas being separated from each other and constituting a suspension area pair; and
        a driving wiring running through a gap between two adjacent suspension areas, the driving area electrodes in two adjacent driving areas in a same row being electrically connected with each other through said driving wiring; and
    wherein said sensing layer comprises a plurality of suspended connection lines each corresponding to a respective suspension area pair, one end of each suspended connection line being electrically connected with a suspension area electrode in a suspension area of a suspension area pair through a first via hole in the insulation layer, the other end thereof being electrically connected with a suspension area electrode in another suspension area of the suspension area pair through a second via hole in the insulation layer.

2. The touch display device according to claim 1, wherein said sensing layer further comprises a plurality of second sensing areas each corresponding to a respective driving area, each second sensing area being arranged right above a corresponding driving area and provided with a sensing area electrode; and wherein the sensing area electrode in the second sensing area is electrically connected with the driving area electrode in the corresponding driving area through a third via hole in the insulation layer.

3. The touch display device according to claim 2, wherein the sensing area electrode in the second sensing area is electrically connected with the driving area electrode in the corresponding driving area through third via holes with a number of at least two in the insulation layer.

4. The touch display device according to claim 3, wherein said third via holes are arranged in a rectangular array.

5. The touch display device according to claim 4, wherein a center-to-center distance between two adjacent third via holes in a same row is three pixels, and a center-to-center distance between two adjacent third via holes in a same column is three pixels.

6. The touch display device according to claim 2, wherein the sensing area electrode in said second sensing area is one selected from a group consisting of a metal grid, a transparent indium tin oxide electrode, and a carbon nanotube electrode.

7. The touch display device according to claim 1,
wherein when an image is displayed, the driving area electrodes and the suspension area electrodes are all electrically connected with an output end of a common voltage of a driving circuit; and
wherein when a touch scanning is performed, the driving area electrodes are electrically connected with the output end of the common voltage of the driving circuit, while the suspension area electrodes are empty.

8. The touch display device according to claim 7, wherein said sensing layer further comprises a plurality of second sensing areas each corresponding to a respective driving area, each second sensing area being arranged right above a corresponding driving area and provided with a sensing area electrode; and wherein the sensing area electrode in the second sensing area is electrically connected with the driving area electrode in the corresponding driving area through a third via hole in the insulation layer.

9. The touch display device according to claim 8, wherein the sensing area electrode in the second sensing area is electrically connected with the driving area electrode in the corresponding driving area through third via holes with a number of at least two in the insulation layer.

10. The touch display device according to claim 9, wherein said third via holes are arranged in a rectangular array.

11. The touch display device according to claim 8, wherein the sensing area electrode in said second sensing area is one selected from a group consisting of a metal grid, a transparent indium tin oxide electrode, and a carbon nanotube electrode.

12. The touch display device according to claim 7, wherein said sensing layer further comprises a plurality of first sensing areas each corresponding to a respective suspension area, each first sensing area being arranged right above a corresponding suspension area and provided with a sensing area electrode.

13. The touch display device according to claim 12, wherein said sensing layer further comprises a plurality of second sensing areas each corresponding to a respective driving area, each second sensing area being arranged right above a corresponding driving area and provided with a sensing area electrode; and wherein the sensing area electrode in the second sensing area is electrically connected with the driving area electrode in the corresponding driving area through a third via hole in the insulation layer.

14. The touch display device according to claim 13, wherein the sensing area electrode in the second sensing area is electrically connected with the driving area electrode in the corresponding driving area through third via holes with a number of at least two in the insulation layer.

15. The touch display device according to claim 13, wherein the sensing area electrode in said second sensing area is one selected from a group consisting of a metal grid, a transparent indium tin oxide electrode, and a carbon nanotube electrode.

16. The touch display device according to claim 12, wherein the sensing area electrode in said first sensing area is one selected from a group consisting of a metal grid, a transparent indium tin oxide electrode, and a carbon nanotube electrode.

17. The touch display device according to claim 16, wherein said sensing layer further comprises a plurality of second sensing areas each corresponding to a respective driving area, each second sensing area being arranged right above a corresponding driving area and provided with a sensing area electrode; and wherein the sensing area electrode in the second sensing area is electrically connected with the driving area electrode in the corresponding driving area through a third via hole in the insulation layer.

18. The touch display device according to claim 17, wherein the sensing area electrode in the second sensing area is electrically connected with the driving area electrode in the corresponding driving area through third via holes with a number of at least two in the insulation layer.

19. The touch display device according to claim 17, wherein the sensing area electrode in said second sensing area is one selected from a group consisting of a metal grid, a transparent indium tin oxide electrode, and a carbon nanotube electrode.

20. An electronic apparatus, comprising a touch display device, which comprises a sensing layer, an insulation layer, and a common electrode layer arranged from top to bottom in sequence, wherein said common electrode layer comprises:
a plurality of driving areas arranged in a rectangular array, each driving area being provided with a driving area electrode;
a plurality of suspension areas arranged between two adjacent columns of driving area, each suspension area being provided with a suspension area electrode, and two adjacent suspension areas being separated from each other and constituting a suspension area pair; and
a driving wiring running through a gap between two adjacent suspension areas, the driving area electrodes in two adjacent driving areas in a same row being electrically connected with each other through said driving wiring; and wherein said sensing layer comprises a plurality of suspended connection lines each corresponding to a respective suspension area pair, one end of each suspended connection line being electrically connected with a suspension area electrode in a suspension area of a suspension area pair through a first via hole in the insulation layer, the other end thereof being electrically connected with a suspension area electrode in another suspension area of the suspension area pair through a second via hole in the insulation layer.

* * * * *